United States Patent
Chou

(10) Patent No.: US 8,013,908 B2
(45) Date of Patent: Sep. 6, 2011

(54) AUTO WHITE BALANCE SYSTEM FOR IMAGE SENSOR AND AUTO WHITE BALANCE METHOD

(75) Inventor: Chieh-Min Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 596 days.

(21) Appl. No.: 12/134,222

(22) Filed: Jun. 6, 2008

(65) Prior Publication Data
US 2009/0079846 A1 Mar. 26, 2009

(30) Foreign Application Priority Data
Sep. 24, 2007 (CN) .......................... 2007 1 0201831

(51) Int. Cl.
*H04N 9/73* (2006.01)
(52) U.S. Cl. ................................... 348/223.1
(58) Field of Classification Search .................. None
See application file for complete search history.

(56) References Cited

U.S. PATENT DOCUMENTS

| 5,565,913 A | 10/1996 | Matsui et al. |
| 5,689,676 A * | 11/1997 | Hirose et al. .................. 711/103 |
| 6,999,776 B2 * | 2/2006 | Ogino et al. ................ 455/456.1 |
| 7,689,119 B2 * | 3/2010 | Seki .............................. 396/429 |
| 2003/0050089 A1 | 3/2003 | Ogino et al. |
| 2008/0068456 A1 * | 3/2008 | Fujii et al. ..................... 348/130 |

FOREIGN PATENT DOCUMENTS

| CN | 1753459 A | 3/2006 |
| JP | 2000-244940 | * 9/2000 |

* cited by examiner

*Primary Examiner* — Luong T Nguyen
(74) *Attorney, Agent, or Firm* — Altis Law Group, Inc.

(57) ABSTRACT

An exemplary auto white balance system for an image sensor includes a global positioning system (GPS) receiver, a memory, a setting determining unit, and a white balance unit. The GPS receiver is configured for receiving signals from a satellite, and calculating its position and local time using signals received from at least four satellites. The memory is configured for storing a number of white balance settings. The setting determining unit is configured for determining which one of the white balance settings is suitable for the current ambient light conditions based on the received signal of the global positioning system receiver. The white balance unit is configured for adjusting the color temperature of a current image captured by the image sensor using the determined white balance setting.

8 Claims, 2 Drawing Sheets

AUTO WHITE BALANCE SYSTEM FOR IMAGE SENSOR AND AUTO WHITE BALANCE METHOD

BACKGROUND

1. Technical Field

The invention relates to an auto white balance system for an image sensor and an auto white balance method.

2. Description of the Related Art

Auto white balance (AWB) is a technological method widely used in image capturing devices for determining the color temperature of the light creating a captured image and adjusting for that color temperature. However, this methodology works based on certain assumptions that do not always match perfectly with the captured scene. For example, a dim outdoor scene may be misinterpreted as an indoor scene and, consequently, an improper adjustment could be made.

Therefore, it is desirable to provide an AWB system and an AWB method, which can overcome the above-mentioned problem.

SUMMARY

In a present embodiment, an auto white balance system for an image sensor includes a global positioning system (GPS) receiver, a memory, a setting determining unit, and a white balance unit. The GPS receiver is configured for receiving signals from a satellite, and calculating the receiver's position and local time using signals received from at least four satellites. The memory is configured for storing a number of white balance settings. The setting determining unit is configured for determining which one of the white balance settings is suitable for the current ambient light conditions based on the received signal of the global positioning system receiver. The white balance unit is configured for adjusting the color temperature of a current image captured by the image sensor using the determined white balance setting.

BRIEF DESCRIPTION OF THE DRAWINGS

Many aspects of the present system and method should be better understood with reference to the accompanying drawings. The components in the drawings are not necessarily drawn to scale, the emphasis instead being placed upon clearly illustrating the principles of the present system and method. Moreover, in the drawings, like reference numerals designate corresponding parts throughout the several views.

DETAILED DESCRIPTION OF THE EMBODIMENTS

Embodiments of the present system and method will now be described in detail with reference to the drawings.

Figure 1:
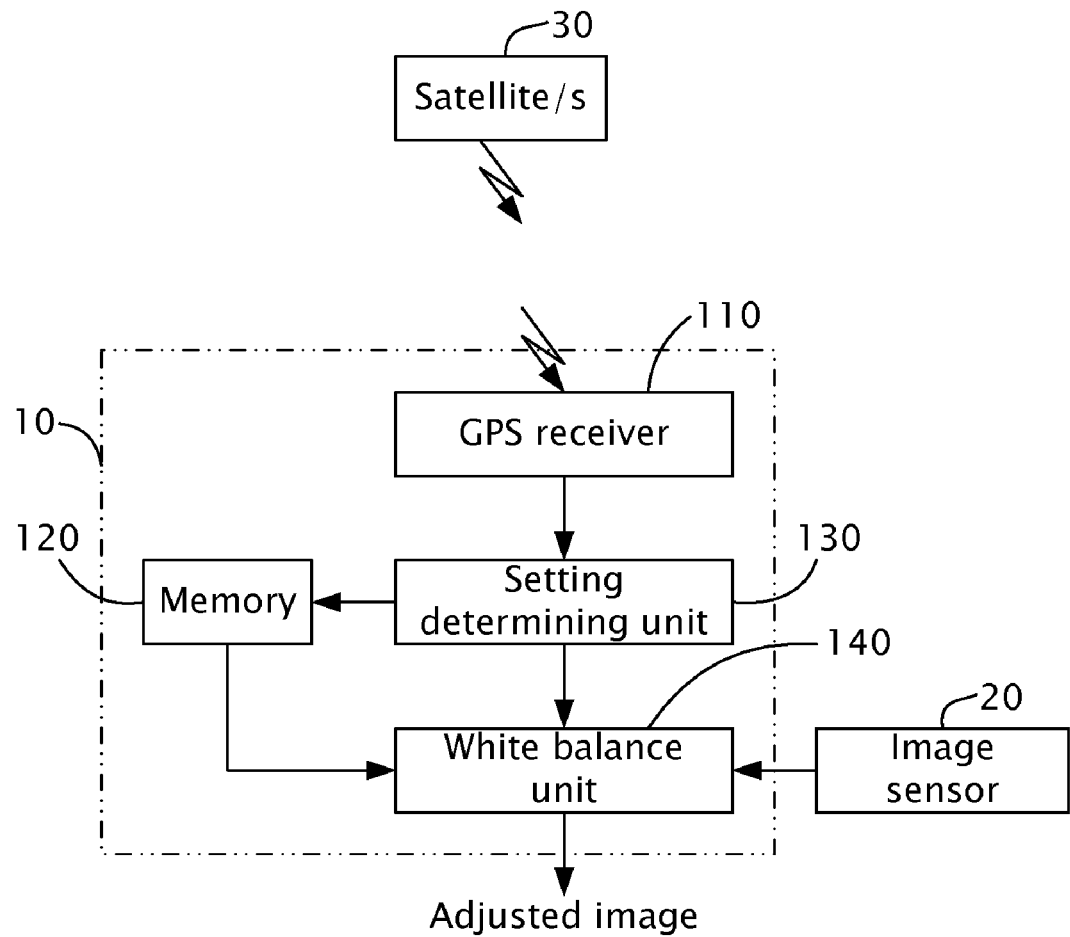
FIG. 1 is a functional block diagram of an auto white balance (AWB) system according to an exemplary embodiment.

Referring to FIG. 1, an AWB system 10, according to an exemplary embodiment, is configured to determine the color temperature of current ambient light that impinges on an image sensor 20, such as a charge coupled device (CCD) image sensor, and make a color temperature adjustment to the image formed by the image sensor 20. The AWB system 10 includes a global positioning system (GPS) receiver 110, a memory 120, a setting determining unit 130, and a white balance unit 140. The GPS receiver 110 is configured for receiving signals from satellite/s 30, and calculating the receiver 110's position and local time using the signals from four or more satellites 30 (the GPS receiver 10 needs at least four measurements to solve for its position (determined by three variables, e.g., coordinates x, y, z, and local time). The memory 120 is configured for storing a number of white balance settings. The setting determining unit 130 is configured for determining which one of the white balance settings is suitable for the current ambient light based on the received signals. The white balance unit 140 is configured for adjusting the color temperature to the image captured by the image sensor 20, using the determined white balance setting.

In detail, it is well known that the intensity of the received signals of a GPS receiver are typically greater than about −145 dbm in the open-air (e.g., −145~−130 dbm), and smaller than that value inside a building (−155~−145 dbm). Thereby, the setting determining unit 130 is capable of distinguishing whether the current scene to be imaged is an indoor scene or an outdoor scene by judging whether the intensity of the received signals of the GPS receiver 110 exceeds −145 dbm. Understandably, images captured indoors or outdoors should be adjusted using different white balance settings. Therefore, it is necessary that the white balance settings include at least one indoor setting and a number of outdoor settings (the color temperature may strongly vary in different regions and periods of time and, accordingly, different outdoor settings are needed). For outdoor settings, the color temperature of the current ambient light can be determined using the output information of the GPS receiver 110 (including the location information and the local time), and thereby determine which white balance setting stored in the memory 120 is suitable, however, this works based on the assumption that the GPS receiver 110 is able to position itself and get local time from satellites. It is advantageous that the outdoor settings include a first outdoor setting for use in case the SPS receiver 110 fails to acquire signals from satellites. The outdoor settings can include a number of second outdoor settings corresponding to different regions, seasons, and local time, e.g., a tropic, spring, midday setting, or a temperate, summer, dusk setting, etc.

Figure 2:
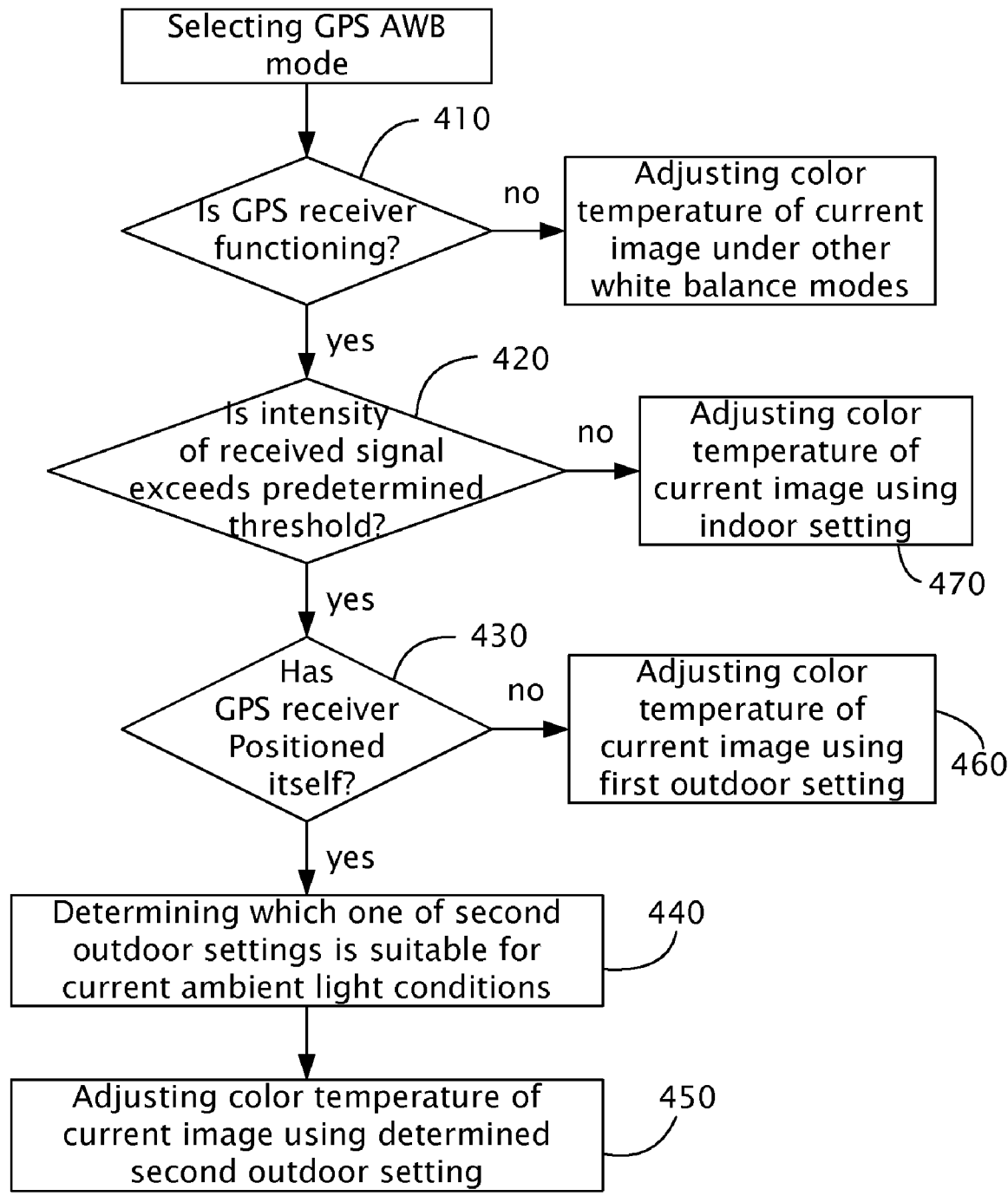
FIG. 2 is flowchart of an AWB method, according to another exemplary embodiment.

Referring to FIG. 2, an AWB method in accordance with another embodiment includes operations 410 through 470. These operations can be performed by, for example, the AWB system 10, when a corresponding white balance mode using the GPS receiver 110, e.g., 'GPS AWB', is selected by a user.

Operation 410: detecting whether the GPS receiver 110 is functioning and receiving satellite signals. If yes, operation 420 will be performed, if no, the process will be stopped, indicating to the user to choose other white balance modes. This operation is carried out by the setting determining unit 130 in this exemplary embodiment.

Operation 420: judging whether the intensity of the received signals of the GPS receiver 110 exceeds a predetermined threshold, e.g., −145 dbm. If yes, operation 430 will be performed, if no, operation 470 will be performed. This operation can be carried out by the setting determining unit 130.

Operation 430: judging whether the GPS receiver 110 is capable of positioning itself by determining the number of received signals. If yes (the number of the available satellites is greater than three (four or more)), operation 440 will be performed, if no, operation 460 will be performed. This operation is also carried out by the setting determining unit 130 in this embodiment.

Operation 440: determining which one of the second outdoor settings is suitable for the current ambient light conditions according to the position and local time information output by the GPS receiver 110. This operation is carried out by the setting determining unit 130.

Operation 450: adjusting the color temperature of a current image captured by the image sensor 20 using the determined second outdoor setting. This operation is carried out by the white balance unit 140.

Operation 460: adjusting the color temperature of the current image captured by the image sensor 20 using the first outdoor setting. This operation is carried out by the white balance unit 140.

Operation 470: adjusting the color temperature of the current image captured by the image sensor 20 using the indoor setting. This operation is carried out by the white balance unit 140.

By using GPS technologies, the AWB system 10 and the AWB provide greater accuracy than conventional systems in making white balance adjustments.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. An auto white balance system for an image sensor, comprising:
   a global positioning system receiver capable of positioning itself and acquiring local time using signals received from satellites;
   a memory capable of storing a plurality of white balance settings;
   a setting determining unit capable of determining which one of the plurality of white balance settings stored in the memory is suitable for a current ambient light condition based on received signals of the global positioning system receiver; and
   a white balance unit capable of adjusting the color temperature of a current image captured by the image sensor using the determined white balance setting,
   wherein the setting determining unit determines which one of the plurality of white balance settings is suitable for the current ambient light condition by judging whether the intensity of the received signal of the global positioning system receiver exceeds a predetermined threshold.

2. The auto white balance system as claimed in claim 1, wherein the plurality of white balance settings comprises an indoor setting that is suitable for an indoor scene.

3. The auto balance system as claimed in claim 1, wherein the plurality of white balance settings comprise an outdoor setting for use in case the global positioning system receiver fails to acquire signals from the satellites.

4. The auto balance system as claimed in claim 1, wherein the plurality of white balance settings comprise a plurality of open-air settings each corresponding to a predetermined region, season and the local time.

5. The auto white balance system as claimed in claim 1, wherein the predetermined threshold is about −145 dbm.

6. An auto white balance method for an auto white balance system, the auto white balance system comprising a global positioning system receiver, and a memory configured for storing a plurality of white balance settings, the global positioning system receiver being configured for positioning itself and acquiring local time using signals received from satellites, the plurality of white balance settings comprising an indoor setting for use in indoor conditions, a first outdoor setting for use in outdoor obstruction conditions, and a plurality of second outdoor settings each corresponding to a predetermined region, seasons and the local time, the auto white balance method comprising:
   judging whether the intensity of the received signals of the global positioning system receiver exceeds a predetermined threshold;
   adjusting the color temperature of a current image captured by an image sensor using the indoor setting if the intensity of the received signals of the global positioning system receiver is below the predetermined threshold;
   judging whether the global positioning system receiver has positioned itself, if the intensity of the received signals of the global positioning system receiver exceeds the predetermined threshold;
   adjusting the color temperature of the current image captured by the image sensor using the first outdoor setting if the global positioning system receiver fails to position itself and if the intensity of the received signals of the global positioning system receiver exceeds the predetermined threshold;
   determining which one of the plurality of second outdoor settings is suitable for current ambient light conditions based on the received signals of the global positioning system receiver if the global positioning system receiver has positioned itself and if the intensity of the received signals of the global positioning system receiver exceeds the predetermined threshold; and
   adjusting the color temperature of the current image captured by the image sensor using the determined second outdoor setting.

7. The auto white balance method as claimed in claim 6, further comprising:
   detecting whether the global positioning system receiver is functioning and receiving satellite signals, if not, stopping the flow of the method.

8. The auto white balance method as claimed in claim 6, wherein the predetermined threshold is about −145 dbm.

* * * * *